US007715157B2

(12) United States Patent
Inoue

(10) Patent No.: US 7,715,157 B2
(45) Date of Patent: May 11, 2010

(54) SEMICONDUCTOR DEVICE AND TRIMMING METHOD OF THE SAME

(75) Inventor: Kohsuke Inoue, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 262 days.

(21) Appl. No.: 11/955,021

(22) Filed: Dec. 12, 2007

(65) Prior Publication Data

US 2008/0192398 A1 Aug. 14, 2008

(30) Foreign Application Priority Data

Feb. 14, 2007 (JP) ............................ 2007-032940

(51) Int. Cl.
*H02H 7/00* (2006.01)

(52) U.S. Cl. ........................................ 361/18; 361/103

(58) Field of Classification Search .................. 361/18, 361/24, 103; 324/713, 714, 721
See application file for complete search history.

(56) References Cited

U.S. PATENT DOCUMENTS 4,320,344 A * 3/1982 Nicholas ..................... 324/451
4,563,631 A * 1/1986 Mashino et al. ............... 322/33
6,130,571 A * 10/2000 Yamamoto .................. 327/525
6,724,202 B2 * 4/2004 Tanizawa .................... 324/725
7,315,792 B2 * 1/2008 Min et al. .................... 702/130
7,385,869 B2 * 6/2008 Ishikawa et al. ............ 365/226
7,467,339 B2 * 12/2008 Tanaka et al. ............... 714/724
7,474,106 B2 * 1/2009 Kanno ........................ 324/713
2004/0004800 A1 * 1/2004 Sicard et al. ................ 361/103
2004/0155636 A1 * 8/2004 Fukui et al. ................. 323/281
2005/0077923 A1 * 4/2005 Kim et al. ...................... 327/50
2005/0264971 A1 * 12/2005 Morino ....................... 361/103
2006/0224351 A1 * 10/2006 Inukai et al. ................ 702/132
2007/0036015 A1 * 2/2007 Sako .......................... 365/211
2007/0140003 A1 * 6/2007 Ido ......................... 365/185.2
2008/0116875 A1 * 5/2008 Ma ............................ 323/313
2008/0162067 A1 * 7/2008 Inukai et al. .................. 702/99
2009/0034332 A1 * 2/2009 Noichi .................. 365/185.09

FOREIGN PATENT DOCUMENTS

JP 8-204582 8/1996
JP 2006-344793 12/2006

* cited by examiner

*Primary Examiner*—Jared J Fureman
*Assistant Examiner*—Christopher J Clark
(74) *Attorney, Agent, or Firm*—Dickstein Shapiro LLP

(57) ABSTRACT

A small-scale semiconductor device having several trimming portions is disclosed. The device includes an auxiliary voltage regulator circuit outputting an output voltage and having a first trimming unit for adjusting the output voltage output from the auxiliary voltage regulator circuit; an auxiliary circuit comparing a first voltage with a second voltage and performing a prescribed operation based on the compared result, where the first voltage is in proportion to the output voltage of the auxiliary voltage regulator circuit and the second voltage is generated by a detecting unit, the auxiliary circuit including a second trimming unit for adjusting the first voltage; and a single test terminal, connected to receive any one of the first voltage and the second voltage, provided as an external terminal of the semiconductor device so as to adjust both the first and the second trimming units.

3 Claims, 4 Drawing Sheets

SEMICONDUCTOR DEVICE AND TRIMMING METHOD OF THE SAME

BACKGROUND OF THE INVENTION

1. Field of the Invention

The present invention relates to a semiconductor device and a trimming method of the same, and more particularly, to a semiconductor device having a trimming circuit capable of reducing the number of external terminals required for trimming some parts of the semiconductor device and a trimming method of the same.

2. Description of the Related Art

Generally, in the manufacturing process of semiconductor devices, characteristics of the semiconductor devices may vary due to the variations of parts in the circuits caused by the variation of the manufacturing process. Because of this feature of a semiconductor device, a trimming method is conventionally used to maintain the characteristics especially when the characteristics are required to be highly accurate.

As an example of a conventional semiconductor device, FIG. 3 shows a schematic circuit diagram of a conventional semiconductor device 1 that includes an auxiliary voltage regulator circuit 10 and a voltage regulator circuit 20.

The auxiliary voltage regulator circuit 10 includes a comparator 11 and outputs an output voltage Vs to supply power to an internal circuit (not shown) and a reference voltage circuit 22 of the voltage regulator circuit 20. The auxiliary voltage regulator circuit 10 further includes a resistor R1 as a first trimming unit so as to adjust the output voltage Vs. The comparator 11 operates such that a divided voltage divided from the output voltage Vs by the resistor R1 and a resistor R2 is equal to a reference voltage Vr1 applied to the comparator 11. Further, a test terminal T1 is provided as an external terminal of the semiconductor device 1 for performing a first trimming adjustment. The voltage regulator circuit 20 includes a comparator 21, the reference voltage circuit 22, and an overheat protection circuit 23 and outputs an output voltage Vo. The comparator 21 operates such that a divided voltage divided from the output voltage Vo by resistors R3 and R4 is equal to a prescribed reference voltage Vr2 output from the reference voltage circuit 22. Further, a test terminal T2 extending from the overheat protection circuit 23 is provided as another external terminal. A detailed description of the overheat protection circuit as well as the connection with the test terminal T2 is provided below with reference to FIG. 4.

FIG. 4 is a schematic circuit diagram of the overheat protection circuit 23 in FIG. 3. As shown in FIG. 4, the overheat protection circuit 23 includes a reference voltage source 25 generating a reference voltage Vr3, a temperature detection diode D1, a constant current source I1, and a comparator 24. The reference voltage source 25 outputting an adjustable reference voltage Vr3 is provided as a second trimming unit so as to set a temperature at which the overheat protection circuit 23 is activated. The test terminal T2 for performing a second trimming adjustment is provided as an external terminal of the semiconductor device 1.

To perform the first trimming adjustment to adjust the output voltage Vs output from the auxiliary voltage regulator 10, the voltage at the test terminal T1 is measured. Then, a trimming is performed with respect to the resistor R1 of the first trimming unit based on the measured voltage.

To perform the second trimming adjustment to adjust the temperature at which the overheat protection circuit 23 is activated, a voltage applied to the test terminal T2 is gradually changed to detect a voltage at which the overheat protection circuit 23 is activated. The detected voltage is adjusted by a trimming voltage determined based on the difference between the chip temperature of the semiconductor device when this test is performed and the chip temperature at which the overheat protection circuit is to be activated. Then the reference voltage Vr3 of the second trimming unit is adjusted so as to be equal to the adjusted voltage.

Unfortunately, as described above, in a conventional trimming method, each test terminal constituting an external terminal is always necessary for the corresponding trimming portion of the semiconductor device.

To solve the problem, a method reducing the number of terminals used for trimming is disclosed in, for example, Japanese Patent Application Publication No. H08-204582. According to the Patent Document, the number of terminal is reduced by providing a decoder and data from a trimming circuit is decoded by the decoder and then output from an external terminal. This method may be advantageously employed when there are many trimming portions in the semiconductor device, but may be disadvantageous particularly when there are only a few trimming portions in the semiconductor device. Namely, when this method is employed in small-scale semiconductor devices, the circuit scales may be rather increased due to the additional control circuit including the decoder and control terminals connected from the control circuit. Therefore, this trimming method may not fit a small-scale semiconductor device.

Generally and unfortunately, in a semiconductor device, when the number of external terminals increases, the area of the semiconductor chip accordingly increases and the cost is also increased. Especially, the smaller the area of the semiconductor chip is, the more strongly is the semiconductor chip affected by the increase of the external terminals. In addition, the number of the external terminals is a major factor in determining the package size of the semiconductor device. Namely, when the number of the external terminals increases, the package size becomes larger accordingly and the cost is also increased. Further disadvantageously, a larger area for mounting parts becomes necessary and as a result, the size of a system using the semiconductor device may be increased.

SUMMARY OF THE INVENTION

The present invention is made in light of the above problems and may provide a small-scale semiconductor device having several trimming portions and a trimming method of the same in which trimming can be performed without increasing the number of test terminals in proportion to the number of trimming portions.

According to one aspect of the present invention, there is provided a semiconductor device including an auxiliary voltage regulator circuit, provided in the semiconductor device, outputting an output voltage to supply power to an internal circuit of the semiconductor device, where the auxiliary voltage regulator circuit includes a first trimming unit for adjusting the output voltage output from the auxiliary voltage regulator circuit to the internal circuit; an auxiliary circuit comparing a first voltage with a second voltage and performing a prescribed operation based on the comparison result, where the first voltage is in proportion to the output voltage of the auxiliary voltage regulator circuit, and the second voltage is generated by a detecting unit, the auxiliary circuit including a second trimming unit for adjusting the first voltage; and a single test terminal, connected to receive any one of the first voltage and the second voltage, provided as an external terminal of the semiconductor device so as to adjust the first and the second trimming units.

According to another aspect of the present invention, there is provided a semiconductor device further including a voltage regulator circuit, in which the auxiliary circuit is an overheat protection circuit detecting the temperature of a semiconductor chip of the semiconductor device and cutting off an output current of the voltage regulator circuit when the temperature exceeds a prescribed temperature.

According to still another aspect of the present invention, there is provided a method of trimming a semiconductor device, where the semiconductor device includes an auxiliary voltage regulator circuit, provided in the semiconductor device, outputting an output voltage to supply power to an internal circuit of the semiconductor device; an auxiliary circuit comparing a first voltage with a second voltage and performing a prescribed operation based on the comparison result, the first voltage being in proportion to the output voltage of the auxiliary voltage regulator circuit, the second voltage being generated by a detecting unit in the auxiliary circuit; and a single test terminal; the method of trimming including in order the steps of trimming a first trimming unit using the single test terminal to adjust the output voltage output from the auxiliary voltage regulator circuit to the internal circuit, and trimming a second trimming unit using the single test terminal to adjust the first voltage of the auxiliary circuit.

According to an embodiment of the present invention, when a semiconductor device includes an auxiliary voltage regulator circuit and an auxiliary circuit, the auxiliary circuit to be trimmed being driven by a voltage V1 in proportion to an output voltage Vs of the auxiliary voltage regulator circuit, both an output voltage Vs can be adjusted and the auxiliary circuit can be trimmed by measuring the voltage V1 using a single external terminal without additional external terminals.

DETAILED DESCRIPTION OF THE PREFERRED EMBODIMENTS

In the following, embodiments of the present invention are described in detail with reference to the accompanying drawings.

Figure 1:
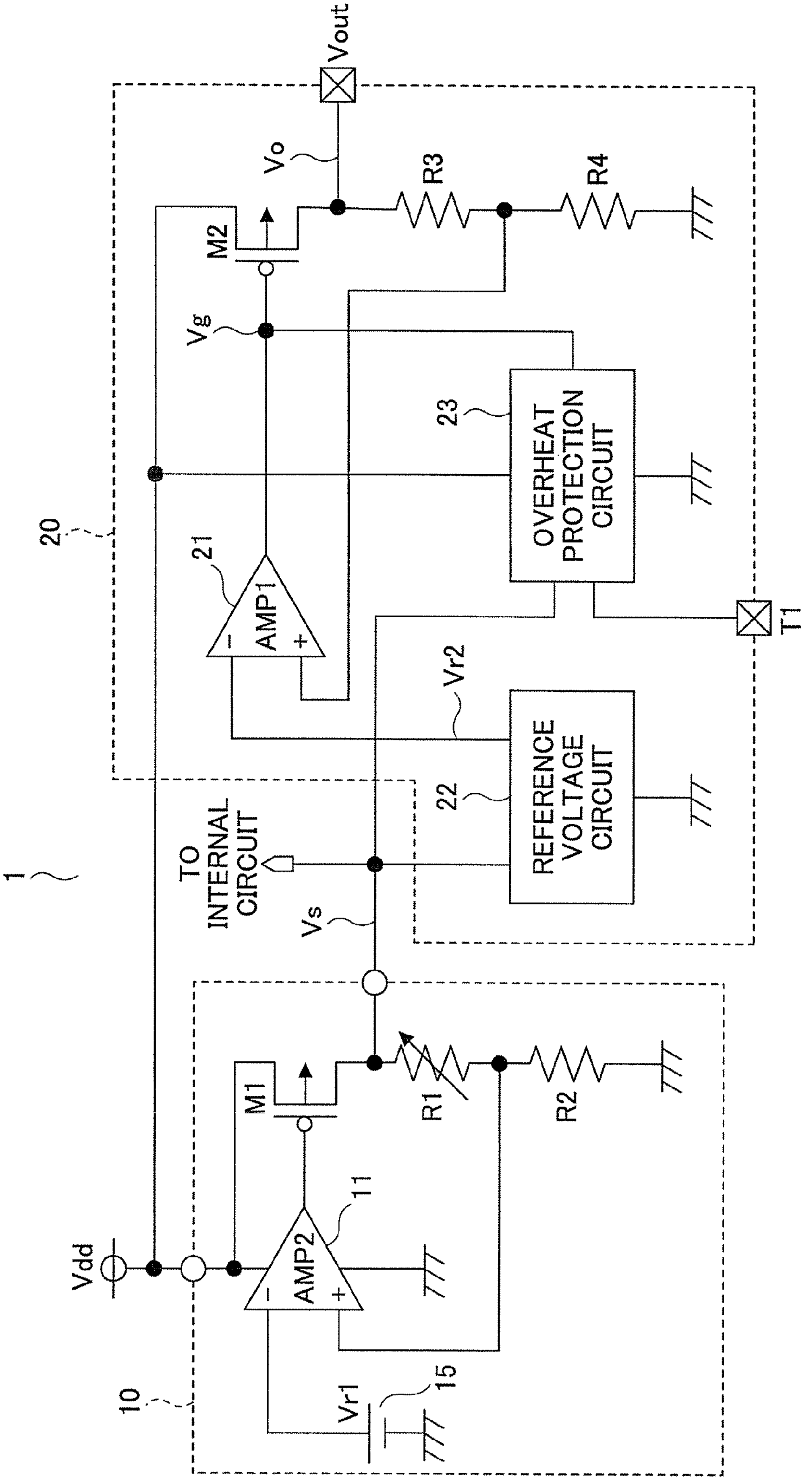
FIG. 1 is a schematic circuit diagram of a semiconductor device according to an embodiment of the present invention.

FIG. 1 is a schematic circuit diagram showing a semiconductor device according to an embodiment of the present invention.

Figure 3:
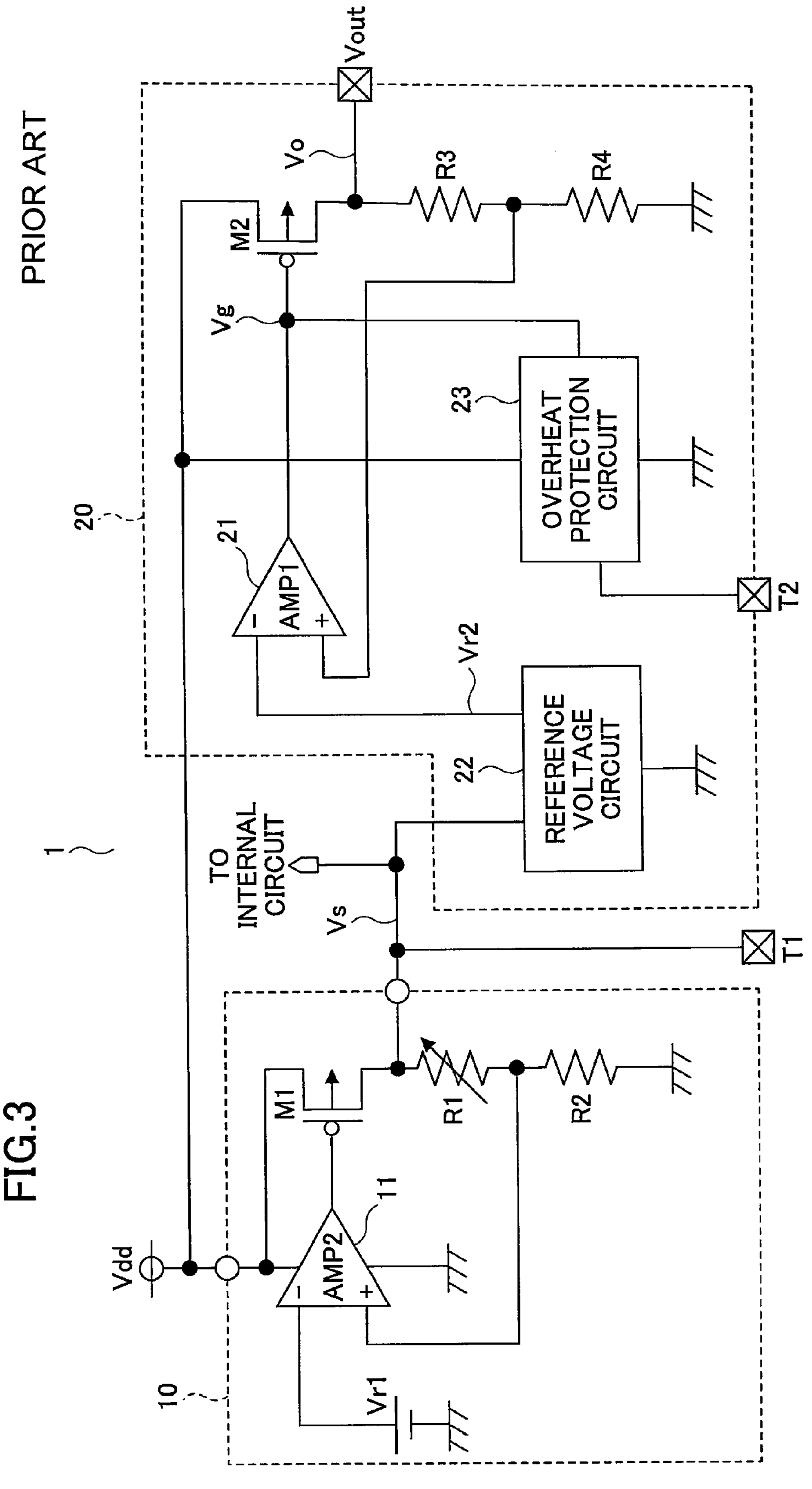
FIG.3 PRIOR ART
FIG. 3 is a schematic circuit diagram of a conventional semiconductor device including an auxiliary voltage regulator circuit and a voltage regulator circuit.
Figure 4:
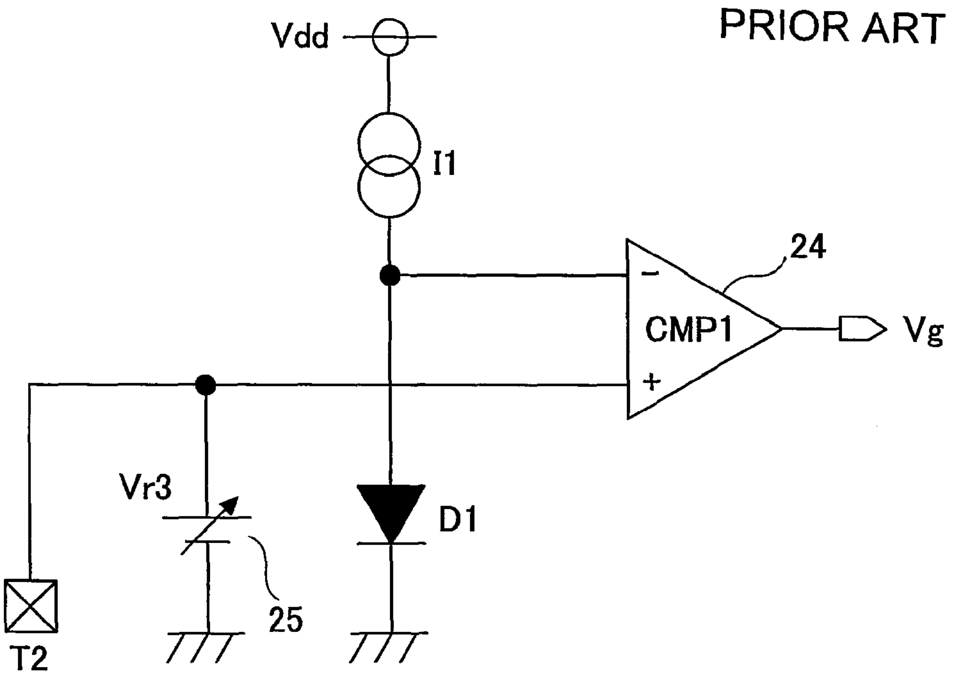
FIG. 4 is a detailed circuit diagram of the overheat protection circuit of the conventional semiconductor device in FIG. 3.

Similar to FIG. 3, the semiconductor device 1 includes an auxiliary voltage regulator circuit 10 and a voltage regulator circuit 20. The auxiliary voltage regulator circuit 10 includes a reference voltage source 15 generating a reference voltage Vr1, a comparator 11, an output transistor M1, and resistors R1 and R2 for detecting an output voltage Vs of the auxiliary voltage regulator circuit 10. The output voltage Vs output from the auxiliary voltage regulator circuit 10 is applied to an internal circuit (not shown) of the semiconductor device 1, and a reference voltage circuit 22 and an overheat protection circuit 23 of the voltage regulator circuit 20 to supply power to the circuits. As a first trimming unit to adjust the output voltage Vs, the variable resistor R1 is provided for detecting the output voltage Vs.

The voltage regulator circuit 20 includes a comparator 21, an output transistor M2, the overheat protection circuit 23, and resistors R3 and R4.

Figure 2A:
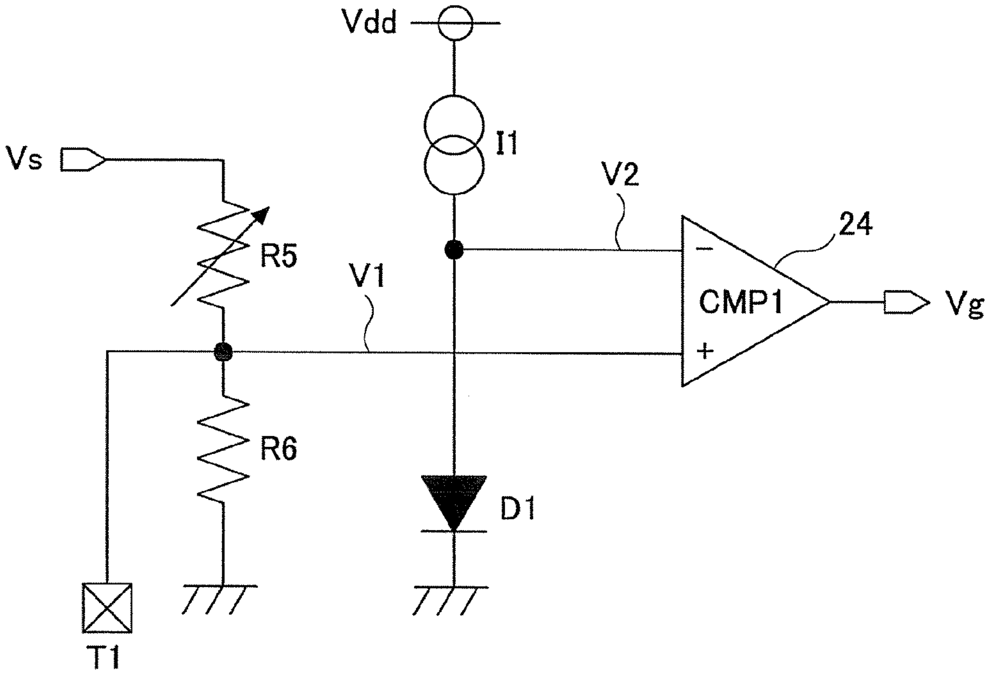
FIGS. 2A and 2B are detailed circuit diagrams of the overheat protection circuit of a semiconductor device according to an embodiment of the present invention in FIG. 1.
Figure 2B:
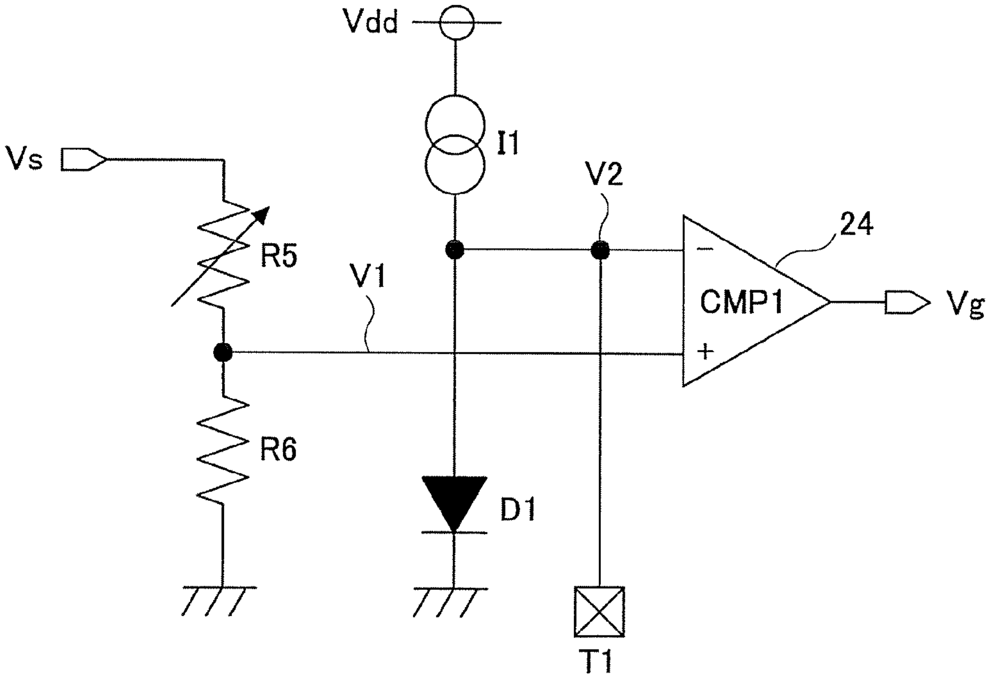

FIGS. 2A and 2B are detailed circuit diagrams of the overheat protection circuit 23 in FIG. 1. The overheat protection circuit 23 includes resistors R5 and R6 for dividing the output voltage Vs output from the auxiliary voltage regulator circuit 10 and generating a first voltage V1, a temperature detection diode D1 for detecting the temperature of a semiconductor chip of the semiconductor device 1, a constant current source 11 providing a constant current to the diode D1, and a comparator 24 comparing the first voltage V1 with a second voltage V2 applied between the terminals of the diode D1.

It should be noted that the configurations of the circuits of FIGS. 2A and 2B are the same except that a test terminal T1 is connected to the conjunction of the resistors R5 and R6 in FIG. 2A but the test terminal T1 is connected to the anode of the diode D1 having the second voltage V2 in FIG. 2B.

Next, a method of trimming is described. According to an embodiment of the present invention, trimming is performed in the order of adjusting the output voltage Vs of the auxiliary voltage regulator circuit 10 and then adjusting the overheat protection circuit 23.

When trimming is performed with respect to a semiconductor device having the overheat protection circuit in FIG. 2A, the voltage V1 is first measured using the test terminal T1. Since the resistance values of the resistors R5 and R6 are given, the output voltage Vs output from the auxiliary voltage regulator circuit 10 is obtained by the following formula (1):

$$Vs=V1*(R5+R6)/R6 \quad (1)$$

In a semiconductor device, it is known that, when the resistances of the resistors R5 and R6 vary due to the variation of the manufacturing process, since both resistors suffer the same variation, the resistance ratio of resistor R5 to resistor R6 is substantially unchanged.

When the resistances of the both resistors R5 and R6 vary in the same ratio "α", the output voltage Vs output from the auxiliary voltage regulator circuit 10 is obtained by the following formula (2):

$$\begin{aligned} Vs &= V1*(R5*\alpha+R6*\alpha)/(R6*\alpha) \quad (2) \\ &= V1*(R5+R6)/R6 \end{aligned}$$

Since the formula (2) is exactly the same as the formula (1), the first voltage V1 is found to be independent of the variation of a manufacturing process.

By using this feature, the output voltage Vs of the auxiliary voltage regulator circuit 10 can be accurately obtained by measuring the voltage V1 using the test terminal T1. Based on the measured voltage V1, the resistance of the resistors R1 to be trimmed can be calculated. As a result, the output voltage Vs can be adjusted by performing the first trimming based on the calculated resistance to be trimmed.

Next, the trimming of the overheat protection circuit 23 is performed. First, a voltage applied to the test terminal T1 is gradually increased to detect an applied voltage at which the overheat protection circuit 23 is activated.

Since the temperature characteristics of the voltage Vf between the terminals of the temperature detection diode D1 are known, a setting voltage of the test terminal T1 is calculated based on the temperature difference between a temperature when the above test is performed and a temperature when the overheat protection circuit 23 is to be activated. Then, trimming of the resistor R5 of the second trimming unit is performed such that the first voltage V1 is substantially equal to the calculated setting voltage of the test terminal T1.

Namely, the first voltage V1 after trimming is expressed by in the following formula (3):

$$V1 = V1a + \gamma * (Ts - Ta) \quad (3)$$

Where:

Ta: chip temperature when the test is performed

Ts: chip temperature at which the overheat protection circuit is to be activated γ: temperature coefficient of the voltage Vf between the terminals of the temperature detection diode D1

V1*a*: the first voltage at which the overheat protection circuit is activated when the test is performed When trimming is performed with respect to a semiconductor device having the overheat protection circuit in FIG. 2B, voltage applied to the test terminal T1 using test equipment is gradually changed to detect the second voltage V2 at which the overheat protection circuit 23 is activated. Since the second voltage V2 is substantially equal to the first voltage V1, trimming is performed the same as the case where the overheat protection circuit in FIG. 2A is used to adjust the output voltage Vs output from the auxiliary voltage regulator circuit 10.

Next, the trimming of the overheat protection circuit 23 is performed. In the same manner as the case of the overheat protection circuit in FIG. 2A, a voltage applied to the test terminal T1 is gradually increased to detect an applied voltage at which the overheat protection circuit 23 is activated.

Since the detected voltage is the first voltage after the trimming is performed, in the same manner as the case of the overheat protection circuit in FIG. 2A, a setting voltage of the test terminal T1 is calculated based on the temperature difference between a temperature when the above test is performed and a temperature when the overheat protection circuit 23 is to be activated. Then, trimming is performed on the resistor R5 of the second trimming unit to adjust the first V1 voltage so as to be substantially equal to the calculated setting voltage of the test terminal T1.

The present invention is not limited to the above-mentioned embodiments, and variations and modifications may be made without departing from the scope of the present invention.

For example, in the above-mentioned embodiment, an overheat protection circuit is provided as the auxiliary circuit. However, it should be noted that the auxiliary circuit according to an embodiment of the present invention is not limited to the overheat protection circuit, and other circuits such as an over-current protection circuit are also explicitly included in the auxiliary circuit.

The present application is based on and claims the benefit of priority of Japanese Patent Application No. 2007-032940, filed on Feb. 14, 2007, the entire contents of which are hereby incorporated by reference.

What is claimed is:

1. A semiconductor device comprising:

an auxiliary voltage regulator circuit, provided in the semiconductor device, outputting an output voltage to supply power to an internal circuit of the semiconductor device, the auxiliary voltage regulator circuit including a first trimming unit for adjusting the output voltage output from the auxiliary voltage regulator circuit to the internal circuit;

an auxiliary circuit comparing a first voltage with a second voltage and performing a prescribed operation based on the comparison result, the first voltage being in proportion to the output voltage output from the auxiliary voltage regulator circuit, the second voltage being generated by a detecting unit, the auxiliary circuit including a second trimming unit for adjusting the first voltage; and a single test terminal, connected to receive any one of the first voltage and the second voltage, provided as an external terminal of the semiconductor device so as to adjust the first and the second trimming units.

2. The semiconductor device according to claim 1, further comprising a voltage regulator circuit; wherein the auxiliary circuit is an overheat protection circuit detecting a temperature of a semiconductor chip of the semiconductor device and cutting off an output current of the voltage regulator circuit when the temperature exceeds a prescribed temperature.

3. A method of trimming a semiconductor device, the semiconductor device including an auxiliary voltage regulator circuit, provided in the semiconductor device, outputting an output voltage to supply power to an internal circuit of the semiconductor device;

an auxiliary circuit comparing a first voltage with a second voltage and performing a prescribed operation based on the comparison result, the first voltage being in proportion to the output voltage output from the auxiliary voltage regulator circuit, the second voltage being generated by a detecting unit; and a single test terminal;

the method of trimming comprising in order the steps of:

trimming a first trimming unit using the single test terminal to adjust the output voltage output from the auxiliary voltage regulator circuit to the internal circuit; and trimming a second trimming unit using the single test terminal to adjust the first voltage of the auxiliary circuit.

* * * * *